(12) United States Patent
Wang

(10) Patent No.: US 9,355,575 B2
(45) Date of Patent: May 31, 2016

(54) CHEST BAND ASSEMBLY FOR CRASH TEST DUMMY

(71) Applicant: Humanetics Innovative Solutions, inc., Plymouth, MI (US)

(72) Inventor: Zhenwen J. Wang, Northville, MI (US)

(73) Assignee: HUMANETICS INNOVATIVE SOLUTIONS, INC., Plymouth, MI (US)

( * ) Notice: Subject to any disclaimer, the term of this patent is extended or adjusted under 35 U.S.C. 154(b) by 395 days.

(21) Appl. No.: 13/874,660

(22) Filed: May 1, 2013

(65) Prior Publication Data

US 2013/0327164 A1 Dec. 12, 2013

Related U.S. Application Data

(60) Provisional application No. 61/658,493, filed on Jun. 12, 2012.

(51) Int. Cl.
G09B 23/32 (2006.01)
G09B 23/30 (2006.01)

(52) U.S. Cl.
CPC ....................................... *G09B 23/30* (2013.01)

(58) Field of Classification Search
None
See application file for complete search history.

(56) References Cited

U.S. PATENT DOCUMENTS

| | | | |
|---|---|---|---|
| 3,664,038 A | 5/1972 | Searle et al. | |
| 3,753,302 A | 8/1973 | Daniel | |
| 3,757,431 A | 9/1973 | Daniel | |
| 4,261,113 A | 4/1981 | Alderson | |
| 4,409,835 A | 10/1983 | Daniel et al. | |
| 4,701,132 A | 10/1987 | Groesch et al. | |
| 5,018,977 A | 5/1991 | Wiley et al. | |
| 5,317,931 A | 6/1994 | Kalami | |
| 5,701,370 A | 12/1997 | Muhs et al. | |
| 6,206,703 B1 | 3/2001 | O'Bannon | |
| 6,381,069 B1 | 4/2002 | Riant et al. | |
| 6,439,070 B1 | 8/2002 | Beebe et al. | |
| 6,471,710 B1 * | 10/2002 | Bucholtz | 606/130 |
| 6,982,409 B2 | 1/2006 | Huang et al. | |
| 7,086,273 B2 | 8/2006 | Lipmyer | |
| 7,508,530 B1 | 3/2009 | Handman | |
| 7,702,190 B2 | 4/2010 | Hao et al. | |
| RE42,418 E | 6/2011 | Lipmyer | |
| 8,454,368 B2 | 6/2013 | Ault et al. | |
| 8,500,452 B2 | 8/2013 | Trotta et al. | |
| 2007/0058163 A1 | 3/2007 | Handman | |
| 2013/0090552 A1 * | 4/2013 | Ramamurthy et al. | 600/424 |

* cited by examiner

*Primary Examiner* — Robert R Raevis
(74) *Attorney, Agent, or Firm* — Howard & Howard Attorneys PLLC

(57) ABSTRACT

A chest band assembly for a crash test dummy includes a chest band adapted to be disposed about a rib cage of the crash test dummy and a sensor cooperating with the chest band and the rib cage. The sensor is made of a carrier and a plurality of optical fibers bonded to the carrier, wherein each of the optical fibers has at least one sensor.

18 Claims, 4 Drawing Sheets

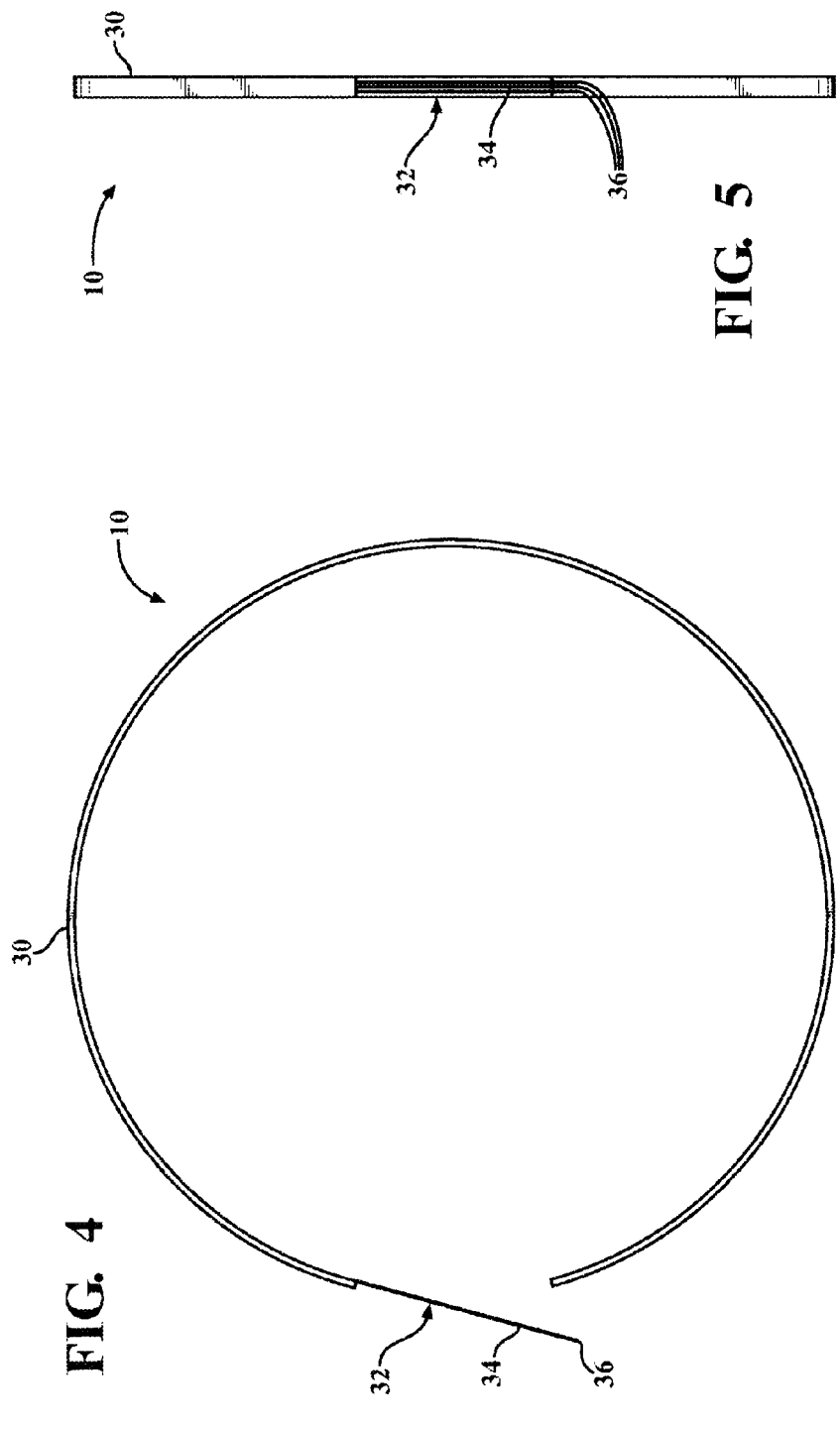
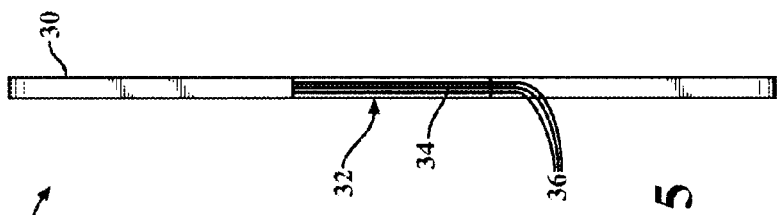
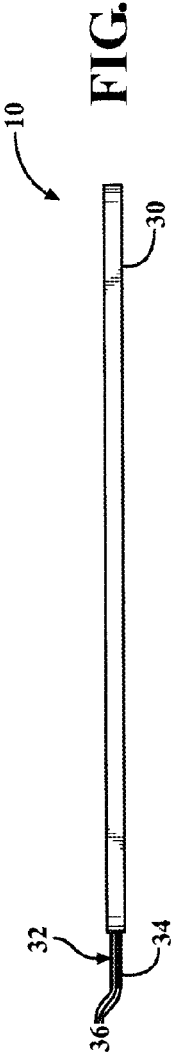
FIG. 4
FIG. 5
FIG. 6

CHEST BAND ASSEMBLY FOR CRASH TEST DUMMY

CROSS-REFERENCE TO RELATED APPLICATION(S)

The present application, claims the priority date of U.S. Provisional Patent Application Ser. No. 61/658,493, filed Jun. 12, 2012.

BACKGROUND OF THE INVENTION

1. Field of the Invention

The present invention relates generally to crash test dummies and, more particularly, to a chest band assembly for a crash test dummy.

2. Description of the Related Art

Automotive, aviation, and other vehicle manufacturers conduct a wide variety of collision testing to measure the effects of a collision on a vehicle and its occupants. Through collision testing, a vehicle manufacturer gains valuable information that can be used to improve the vehicle.

Collision testing often involves the use of anthropomorphic mannequins, better known as "crash test dummies." During collision testing, an operator places a crash test dummy inside a vehicle, and the vehicle undergoes a simulated collision. The collision exposes the crash test dummy to high inertial loading, and sensors inside the crash test dummy, such as accelerometers, pressure gauges, and the like, generate electrical signals of data corresponding to the loading. Cables transmit these electrical signals of data to a data acquisition system (DAS) for subsequent processing. This data reveals information about the effects of the collision on the crash test dummy and can be correlated to the effects that a similar collision would have on a human occupant.

Currently, a chest band is used around a chest of a crash test dummy to measure deformation of a rib cage assembly of the dummy. One disadvantage of the current chest band is that it is bulky due to the number of gages and wires (e.g., 59 gages and 236 wires). Another disadvantage of the chest band is that a relatively large size is used. Yet another disadvantage of the chest band is that it requires frequent maintenance. Still another disadvantage of the chest band is that it is not user friendly. Thus, there is a need in the art for a new chest band that is less bulky, smaller in size, less maintenance, and more user friendly.

SUMMARY OF THE INVENTION

Accordingly, the present invention is a chest band assembly for a crash test dummy. The chest band assembly includes a chest band member and a sensor cooperating with the chest band member. The sensor comprises a carrier and a plurality of optical fibers bonded to the carrier, wherein each of the optical fibers has at least one sensor.

In addition, the present invention is a crash test dummy including a body and a rib cage assembly operatively attached to the body. The crash test dummy includes a chest band assembly disposed about the rib cage assembly. The chest band assembly includes a chest band member and a sensor cooperating with the chest band member and the rib cage assembly, wherein the sensor comprises a carrier and a plurality of optical fibers bonded to the carrier, wherein each of the optical fibers has at least one sensor.

One advantage of the present invention, is that a new chest band assembly is provided for a crash test dummy. Another advantage of the present invention is that the chest band assembly includes a thin sheet metal carrier and multiple Fiber Bragg Grating (FBG) optical fibers that are bonded to the carrier. Yet another advantage of the present invention is that the chest band assembly has a relatively smaller size. Still another advantage of the present invention is that the chest band assembly does not require frequent maintenance. A further advantage of the present invention is that the chest hand assembly is user friendly. Yet a further advantage of the present invention is that the chest band assembly provides a complete torso geometry time history. Still a further advantage of the present invention is that the chest band assembly allows it to compare its shape at any time to its original shape to calculate the deformation. Another advantage of the present invention is that the chest band assembly serves as a new tool for automotive crash impact development. A further advantage of the present invention is that the chest band assembly eliminates bulky ribbon cable and connectors.

Other features and advantages of the present invention will be readily appreciated, as the same becomes better understood, after reading the subsequent description taken in conjunction with the accompanying drawings.

BRIEF DESCRIPTION OF THE DRAWINGS

FIG. 4 is a top view of the chest band assembly of FIG. 3.

FIG. 5 is a front view of the chest band assembly of FIG. 3.

FIG. 6 is a side view of the chest band assembly of FIG. 3.

DESCRIPTION OF THE PREFERRED EMBODIMENT(S)

Figure 1:
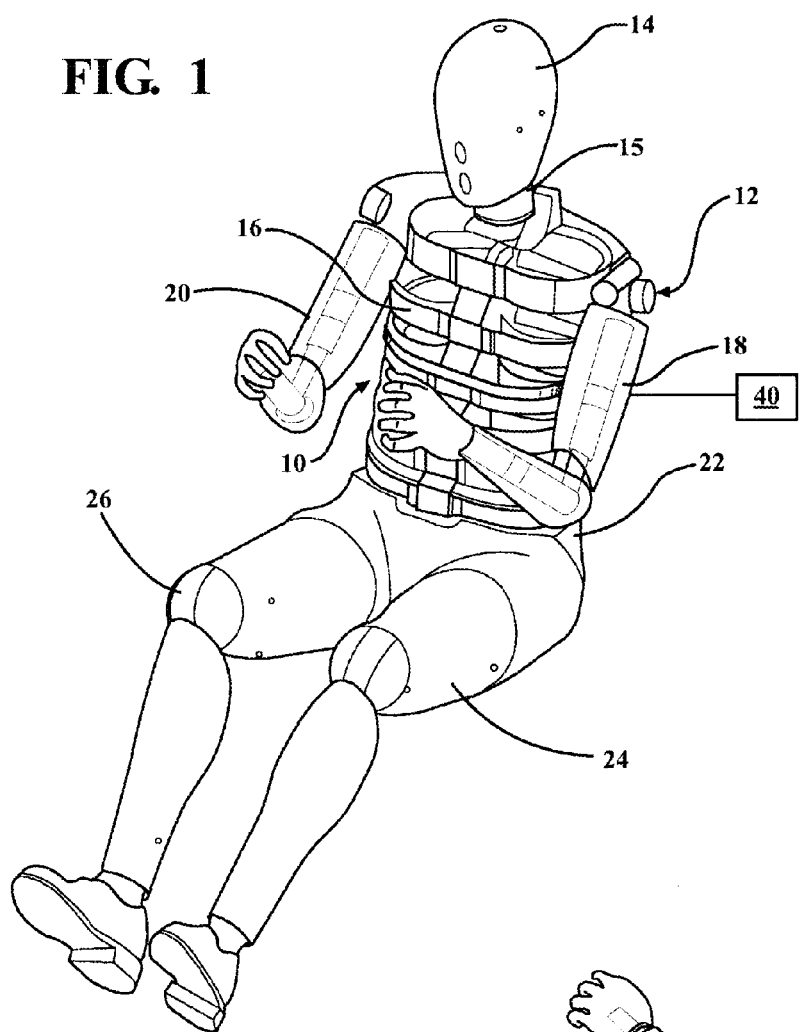
FIG. 1 is a perspective view of one embodiment of a chest band assembly, according to the present invention, illustrated in operational relationship with a crash test dummy.
Figure 2:
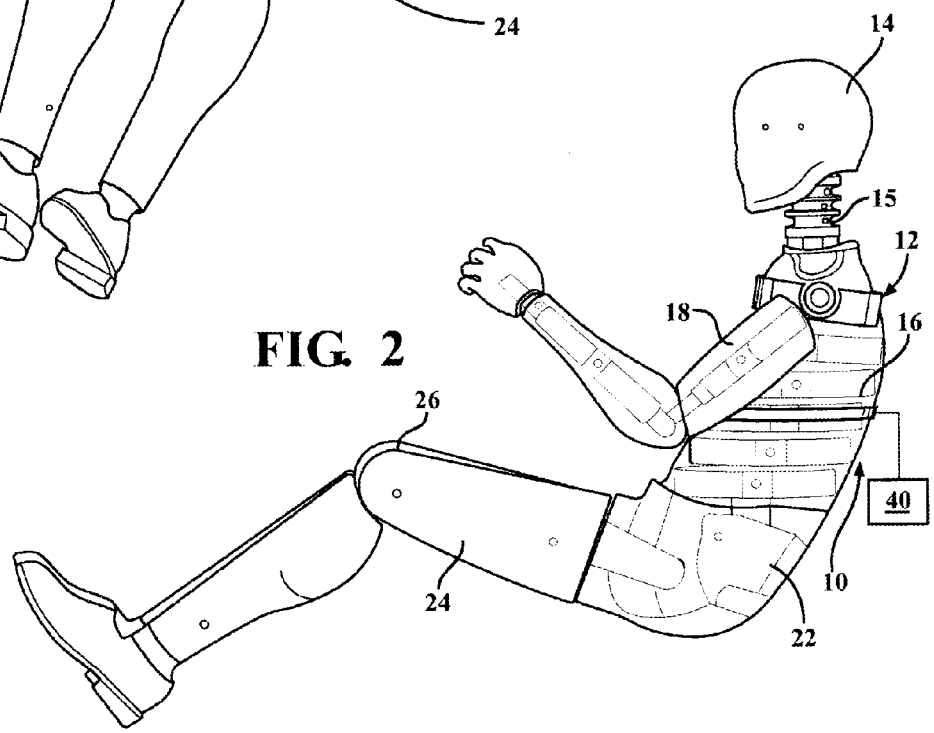
FIG. 2 is a side view of the chest band assembly illustrated in operational relationship with the crash test dummy of FIG. 1.
Figure 3:
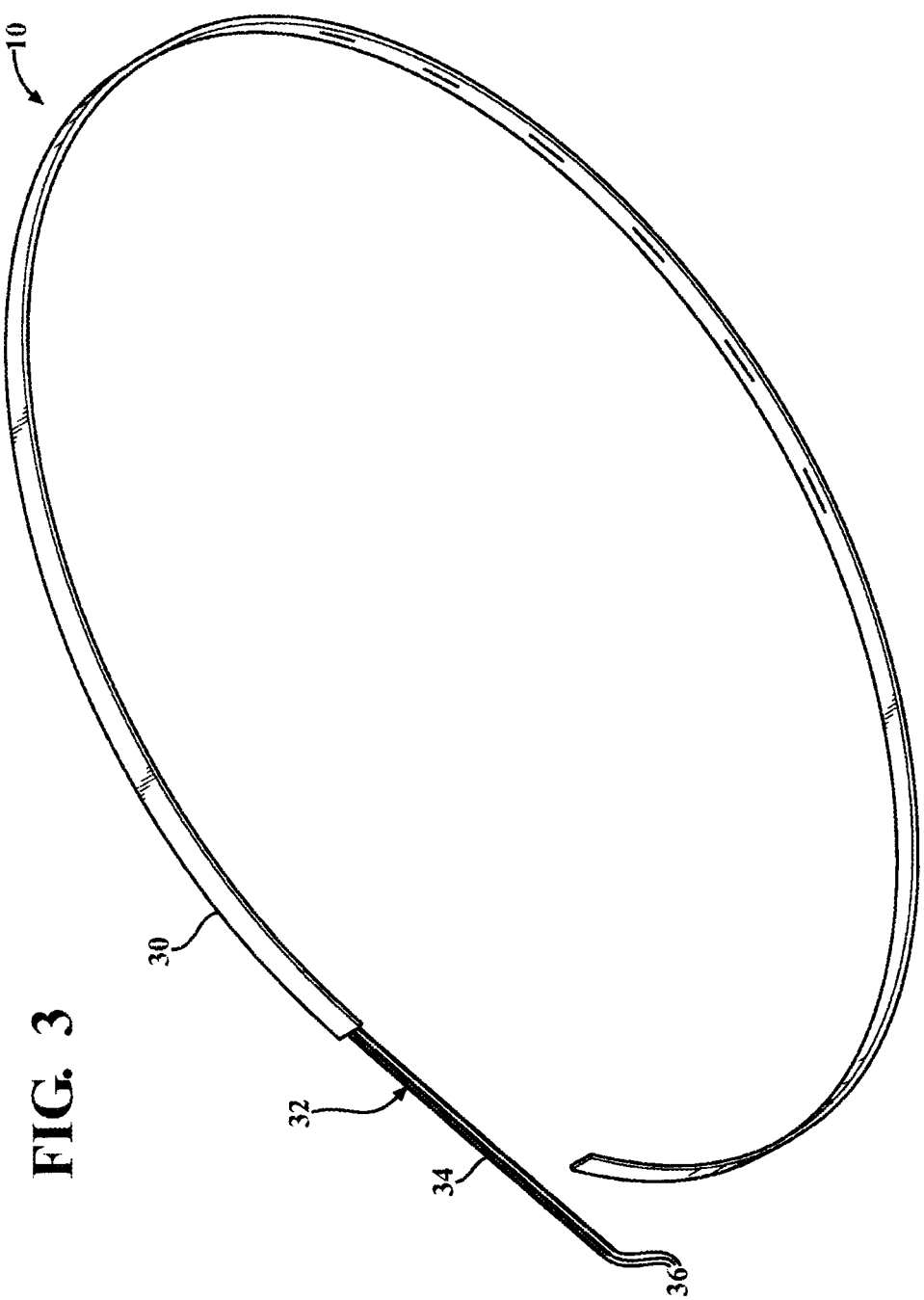
FIG. 3 is an enlarged perspective view of the chest band assembly of FIGS. 1 and 2.

Referring to the drawings and in particular FIGS. 1 and 2, one embodiment of a chest band assembly 10, according to the present invention, is shown in operational relationship with a crash test dummy, generally indicated at 12. The crash test dummy 12 is of a fiftieth percentile (50%) male type and is illustrated in a sitting position. This crash test dummy 12 is used primarily to test the performance of automotive interiors and restraint systems for adult front and rear seat occupants. The size and weight of the crash test dummy 12 are based on anthropometric studies, which are typically done separately by the following organizations, University of Michigan Transportation Research Institute (UMTRI), U.S. Military Anthropometry Survey (ANSUR), and Civilian American and European Surface Anthropometry Resource (CESAR). It should be appreciated that ranges of motions, centers of gravity, and segment masses simulate those of human subjects defined by the anthropometric data.

As illustrated in FIGS. 1 and 2, the crash test dummy 12 has a head assembly 14, which includes a one-piece plastic skull, an instrumentation core, and a vinyl skin. The instrumentation core is removable for access to head instrumentation contained inside the head assembly 14.

The crash test dummy 12 also includes a spine assembly 15 having an upper end mounted to the head assembly 12 by a nodding block (not shown) and a nodding joint (not shown).

The spine assembly 15 has a lower end extending into a torso area of the crash test dummy 12 and is connected to a spine mounting weldment (not shown) by an adapter assembly (not shown).

The torso area of the crash test dummy 12 includes a rib cage assembly 16 connected to the spine assembly 15. The crash test dummy 12 also has a pair of arm assemblies including a right arm assembly 18 and a left arm assembly 20, which are attached to the crash test dummy 12. The left arm assembly 20 includes a clavicle link (not shown), which connects a clavicle (not shown) to the top of the spine assembly 15. It should be appreciated that the right arm assembly 18 is constructed in a similar manner.

As illustrated in the FIGS. 1 and 2, a lower end of the lumbar spine is connected to a lumbar-thoracic adapter (not shown), which is connected to a lumbar to pelvic adapter (not shown). The crash test dummy 12 includes a pelvis assembly 22 connected to the adapter. The crash test dummy 12 also includes a right leg assembly 24 and a left leg assembly 26, which are attached to the pelvis assembly 22. It should also be appreciated that various components of the crash test dummy 12 are covered in a urethane skin such as a flesh and skin assembly (not shown) for improved coupling with the skeleton of the crash test dummy 12. It should further be appreciated that a lifting ring (not shown) may be attached to the head assembly 14 for lifting the crash test dummy 12 into and out of test fixtures and vehicles.

Referring to FIGS. 3 through 6, the chest band assembly 10, according to the present invention, includes a chest band 30 to be disposed about the rib cage assembly 16. The chest band 30 is made of an elastic material. The chest band 30 is approximately two millimeters (2 mm) thick by approximately four millimeters (4 mm) wide by a human torso circumference length.

The chest band assembly 10 also includes a sensor, generally indicated at 32, cooperating with the chest band 30. The sensor 32 includes a carrier 34. The carrier 34 is a thin sheet made of a metal material such as carbon or alloy spring steel. The sensor 32 also includes at least one or a plurality of optical fibers 36 bonded to the carrier 34 by a suitable mechanism such as an epoxy. Each optical fiber 36 has a size of 0.1 mm diameter. Each optical fiber 36 has at least one sensor or a plurality of sensors in each optical fiber. The sensors are Fiber Bragg Gratings. The optical fibers 36 are Fiber Bragg Grating (FBG) optical fibers created by FBG technology. In one embodiment, there are up to eight (8) sensors for each optical fiber 36. For the embodiment illustrated, there are eight (8) optical fibers with 59 channels. It should be appreciated that there is nearly no signal loss in the optical fibers 36, it should also be appreciated that FBG technology offers equivalent mechanical strain measurement.

In contrast to the present invention, normal optical fibers are uniform along their lengths. In a simple FBG optical fiber, the refractive index of the fiber core varies periodically along the length of the fiber, as shown in FIG. 7.

Figure 7:
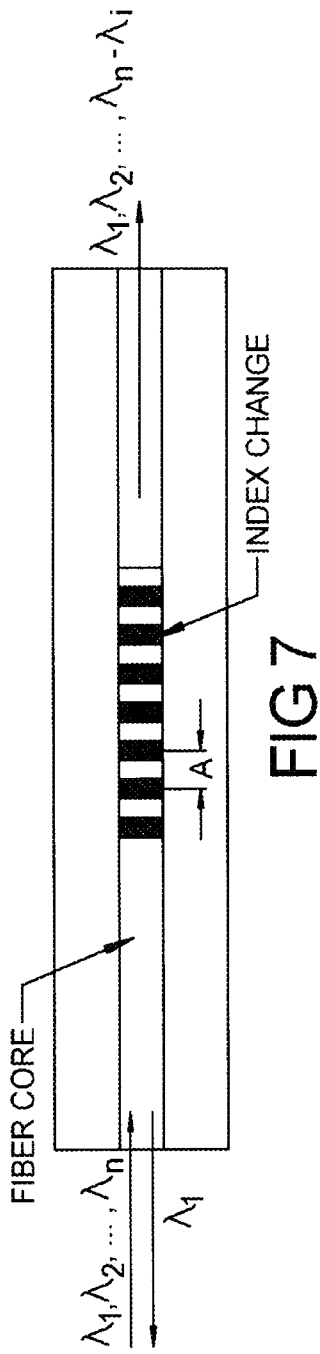
FIG. 7 is a schematic diagram of a fiber Bragg grating.
Figure 8:
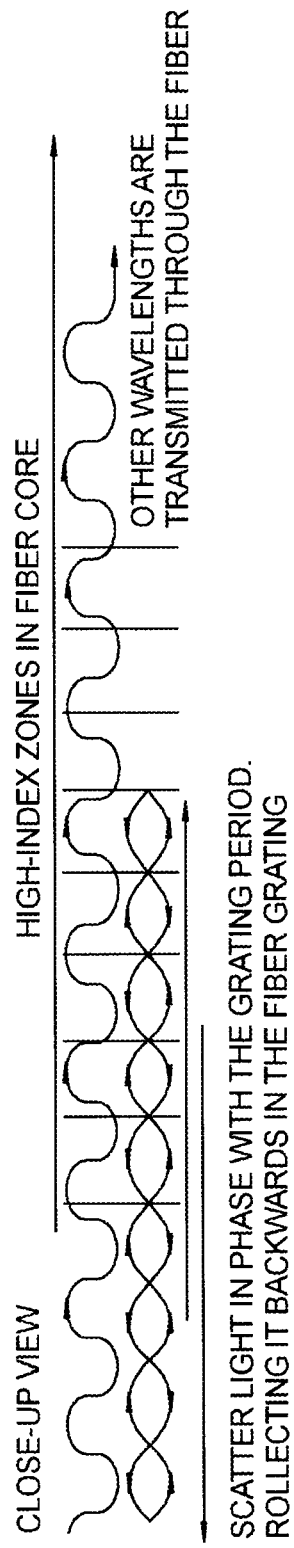
FIG. 8 is a schematic diagram of a reflection phenomena of FIG. 7.

As shown in FIG. 7, the refractive index of the fiber core is modulated with a period of Λ. When a light with a broad spectrum is launched into one end of fiber containing FBG, the part of the light with wavelength matching the Bragg grating wavelength will be reflected back to the input end, with the rest of the light passing through to the other end. This reflection phenomena is explained in FIG. 8.

From the momentum conservation requirement of the Bragg grating condition, the following equation, can be obtained:

$$2\left(\frac{2\pi n_{eff}}{\lambda_B}\right) = \frac{2\pi}{\Lambda}$$

where $n_{eff}$ is the effective refractive index of the fiber core, and $\lambda_B$ is the wavelength of the light reflected by the Bragg grating.

Therefore, the Bragg grating wavelength λB can be expressed as $$\lambda_B = 2n_{eff}\Lambda$$

It should be appreciated that the Bragg grating wavelength is the function of the effective index and the period of the grating.

The fundamental principle behind the operation of FBG is Fresnel reflection. In this case, light traveling between media of different refractive indices may both reflect and refract at the interface.

The FBG will typically have a sinusoidal refractive index variation over a defined length. It should be noted that the definition of Bragg wavelength λB is described from the previous paragraph.

The wavelength spacing between the first minima, (as shown in above figure), or the bandwidth Δλ is given by, $$\Delta\lambda = \left[\frac{2\delta n_0 \eta}{\pi}\right]\lambda_B$$

Where $\delta n_0$ is the variation in the refractive index (n3-n2), and n is the fraction of power in the core. It should be appreciated that a calculation of deformation of the optical fibers 36 can be based on the above equations.

Referring to FIGS. 1 and 2 the chest band assembly 10 also includes an interrogator 40 communicating with the sensor 32 to interrogate the FBG sensor data. The interrogator 40 is connected to the optical fibers 36 and receives the electrical signals of data from the sensors of the optical fibers 36. The interrogator 40 has a sample rate limit of approximately twenty (20) kHz for eight (8) channels and one (1) MHz for single channels. The integrator 40 has four (4) channels with eight (8) sensors per channel. It should be appreciated that, once received, the interrogator 40 stores the data for subsequent data processing.

The interrogator 40 also includes a port (not shown) that allows data stored in the interrogator 40 to be uploaded to a computer (not shown) for processing. For example, in one embodiment, the port is an Ethernet port, and the data is uploaded from the interrogator 40 through this Ethernet port to the computer for processing. In another embodiment, the interrogator 40 can wirelessly communicate stored data to the computer for further processing. The computer has a chest band program containing a chest band calculation algorithm to calculate the deformation of the rib cage assembly 16 based on the curvature of the carrier 34, which can be derived from the measured strain, to reconstruct the deformed shape and compare its shape at any time to its original shape.

In operation, the chest band assembly 10 is disposed about the rib cage assembly 16 of the crash test dummy 12. During impact when the chest band assembly 10 bends along with the rib cage assembly 16, the strain due to the bending is sensed by FBG sensors of the optical fibers 36 and sent to the interrogator 40 where it is finally recorded and stored. The curvature of the carrier 34 can be derived from the measured strain, therefore the deformed shape can be reconstructed. This allows the integrator 40 to compare the impacted shape at any time to its original shape to calculate the deformation. This stored data is then uploaded to the computer (not shown) for processing, and the processed data reveals the effects of the test collision on the crash test dummy 12. It should be appreciated that these effects can help predict the effects of a similar collision on an actual human being.

In addition, the chest band assembly 10 may be used to measure spine curvatures related to human spine curvatures known as Kyphosis and Lordosis. Kyphosis is a curving of the spine that causes a bowing or rounding of the back, which leads to a hunchback or slouching posture. Lordosis is a curving of the spine that causes an abnormal forward or inward curvature of the spine in the lumbar region of a portion of the lumbar and cervical vertebral column. Two segments of the vertebral column, namely cervical and lumbar, are normally lordotic, that is, they are set in a curve that has its convexity anteriorly (the front) and concavity posteriorly (behind), in the context of human anatomy. As a result of the curvatures. Kyphosis and Lordosis angles may be measured. The chest band assembly 10 is placed around the rib cage assembly 16 of the crash test dummy 12 to measure the spine curvatures. It should be appreciated that the chest band assembly 10 would be moved to various locations on the rib cage assembly 16 to measure the above-described human spine curvatures.

Accordingly, the chest band assembly 10 of the present invention has a chest band with FBG sensors (approximately 6 mm×3 mm cross section) that results in a significant reduction of the traditional chest band (64 mm×13 mm cross section). Due to the advantage of the serial communication for multiple sensors in one fiber, the chest band assembly 10 of the present invention reduces significantly the number of wire conductors. In the chest band assembly 10 of the present invention, typically one optical fiber 36 with eight (8) FBG sensors has a diameter of 0.1 mm diameter, while the eight (8) traditional strain gages requires thirty-two (32) conductors and each conductor has a diameter of more than one millimeter (1 mm).

The present invention has been described in an illustrative manner. It is to be understood that the terminology, which has been used, is intended to be in the nature of words of description rather than of limitation.

Many modifications and variations of the present invention are possible in light of the above teachings. Therefore, the present invention may be practiced other than as specifically described.

What is claimed is:

1. A chest band assembly for a crash test dummy comprising:
   a chest band adapted to be disposed about a rib cage of the crash test dummy;
   a sensor cooperating with said chest band; and
   wherein said sensor is made of a metal material carrier and a plurality of optical fibers bonded to said carrier, wherein each of said optical fibers has at least one sensor.

2. A chest band assembly as set forth in claim 1 wherein said metal material is spring steel.

3. A chest band assembly as set forth in claim 1 wherein said optical fibers are Fiber Bragg Grating optical fibers.

4. A chest band assembly as set forth in claim 1 wherein said at least one sensor is a Fiber Bragg Grating.

5. A chest band assembly as set forth in claim 1 including an integrator communicating with said optical fibers to record a strain of said optical fibers.

6. A chest band assembly as set forth in claim 1 wherein said optical fibers have a diameter of approximately 0.1 millimeters.

7. A chest band assembly as set forth in claim 1 wherein each of said optical fibers includes a plurality of said at least one sensor.

8. A crash test dummy comprising:
   a body;
   a rib cage assembly operatively attached to said body; and
   a chest band assembly comprising a chest band disposed about said rib cage assembly and a sensor cooperating with said chest band, wherein said sensor is made of a carrier and a plurality of optical fibers bonded to said carrier, wherein each of said optical fibers has at least one sensor.

9. A crash test dummy as set forth in claim 8 wherein said carrier is made of a metal material.

10. A crash test dummy as set forth in claim 9 wherein said metal material is spring steel.

11. A crash test dummy as set forth in claim 8 wherein said at least one sensor is a Fiber Bragg Grating.

12. A crash test dummy as set forth in claim 8 wherein said optical fibers are Fiber Bragg Grating optical fibers.

13. A crash test dummy as set forth in claim 8 wherein each of said optical fibers has a plurality of said at least one sensor.

14. A crash test dummy as set forth in claim 8 including an integrator communicating with said optical fibers to record a strain of said optical fibers.

15. A crash test dummy as set forth in claim 8 wherein said optical fibers have a diameter of approximately 0.1 millimeters.

16. A crash test dummy comprising:
   a body;
   a rib cage assembly operatively attached to said body;
   a chest band assembly comprising a chest band disposed about said rib cage assembly and a sensor cooperating with said chest band, wherein said sensor is made of a carrier and a plurality of Fiber Bragg Grating optical fibers bonded to said carrier, wherein each of said optical fibers has a diameter of approximately 0.1 millimeters; and
   an integrator communicating with said optical fibers to record a strain of said optical fibers.

17. A crash test dummy as set forth in claim 16 wherein said carrier is made of a metal material.

18. A crash test dummy as set forth in claim 17 wherein said metal material is spring steel.

* * * * *